United States Patent
Riasati

(10) Patent No.: US 9,479,799 B1
(45) Date of Patent: Oct. 25, 2016

(54) COMPRESSION USING AN ITERATIVE DATA DERIVED BASIS SET

(71) Applicant: Quantenna Communications, Inc., Fremont, CA (US)

(72) Inventor: Vahid R. Riasati, Northridge, CA (US)

(73) Assignee: Quantenna Communications, Inc., Fremont, CA (US)

( * ) Notice: Subject to any disclaimer, the term of this patent is extended or adjusted under 35 U.S.C. 154(b) by 0 days.

(21) Appl. No.: 14/846,719

(22) Filed: Sep. 4, 2015

Related U.S. Application Data

(60) Provisional application No. 62/046,704, filed on Sep. 5, 2014.

(51) Int. Cl.
| | |
|---|---|
| *G06K 9/36* | (2006.01) |
| *H04N 19/625* | (2014.01) |
| *H04N 19/124* | (2014.01) |
| *H04N 19/182* | (2014.01) |
| *H04N 19/176* | (2014.01) |
| *H04N 19/122* | (2014.01) |

(52) U.S. Cl.
CPC .......... *H04N 19/625* (2014.11); *H04N 19/122* (2014.11); *H04N 19/124* (2014.11); *H04N 19/176* (2014.11); *H04N 19/182* (2014.11)

(58) Field of Classification Search
CPC ......... G06K 9/6247; G06T 7/40; G06T 9/00; G06T 9/008; H04N 1/64; H04N 19/122; H04N 13/124; H04N 19/126; H04N 19/172; H04N 19/176; H04N 19/182; H04N 19/186; H04N 19/60; H04N 19/625; H04N 19/90; G06F 17/16
See application file for complete search history.

(56) References Cited

U.S. PATENT DOCUMENTS

| | | | |
|---|---|---|---|
| 5,301,241 A | 4/1994 | Kirk | |
| 6,754,383 B1 * | 6/2004 | Payton | H04N 1/64 358/523 |
| 7,194,128 B1 * | 3/2007 | Payton | H04N 19/60 375/E7.226 |
| 7,574,057 B1 * | 8/2009 | Yang | G06K 9/6247 382/103 |
| 9,142,037 B2 * | 9/2015 | Nystad | H04N 19/90 |

OTHER PUBLICATIONS

V. R. Riasati; W.Gao; "Adaptive Data Reduction with Immproved Information Association"; SPIE: Defense, Security and Sensing Apr. 2012.

(Continued)

*Primary Examiner* — Jose Couso
(74) *Attorney, Agent, or Firm* — IP Creators; Charles C Cary

(57) ABSTRACT

An apparatus for compressing an image including: a principal component analyzer, a puncture, a truncator, and a projector. The principal component analyzer iteratively performs a Principal Component Analysis (PCA) on a selected portion of the image, wherein each resulting orthogonal basis set has "N" basis vectors. The puncturer punctures selected dimensional components of the orthogonal basis set resulting from each PCA of the selected portion of the image, without removing any of the associated "N" basis vectors thereof. The truncator removes selected basis vectors of a final one of the resulting orthogonal basis sets of the principal component analyzer, thereby forming a truncated basis set for compression of the selected portion of the image. The projector projects the image onto the truncated basis set thereby obtaining coefficients of the selected portion of the image, relative to the truncated basis set.

13 Claims, 5 Drawing Sheets

MP-CPA Image Compression exhibits Improved Fidelity to Original

(56) References Cited

OTHER PUBLICATIONS

V. R. Riasati; W.Gao; "Feature Clustering in Direct Eigen-Vector Data Reduction Using Support Vector Machines" SPIE: Defense, Security and Sensing Apr. 2012.

V. R. Riasati; U. Srinivas; V. Monga; "SAR Automatic Target Recognition via Non-Negative Matrix Approximations"; SPIE: Defense, Security and Sensing Apr. 2012.

U. Srinivas; V. Monga; V.R. Riasati; "A Comparative Study of Basis Selection Techniques for Automatic Target Recognition; " IEEE Radarcon 2012.

* cited by examiner

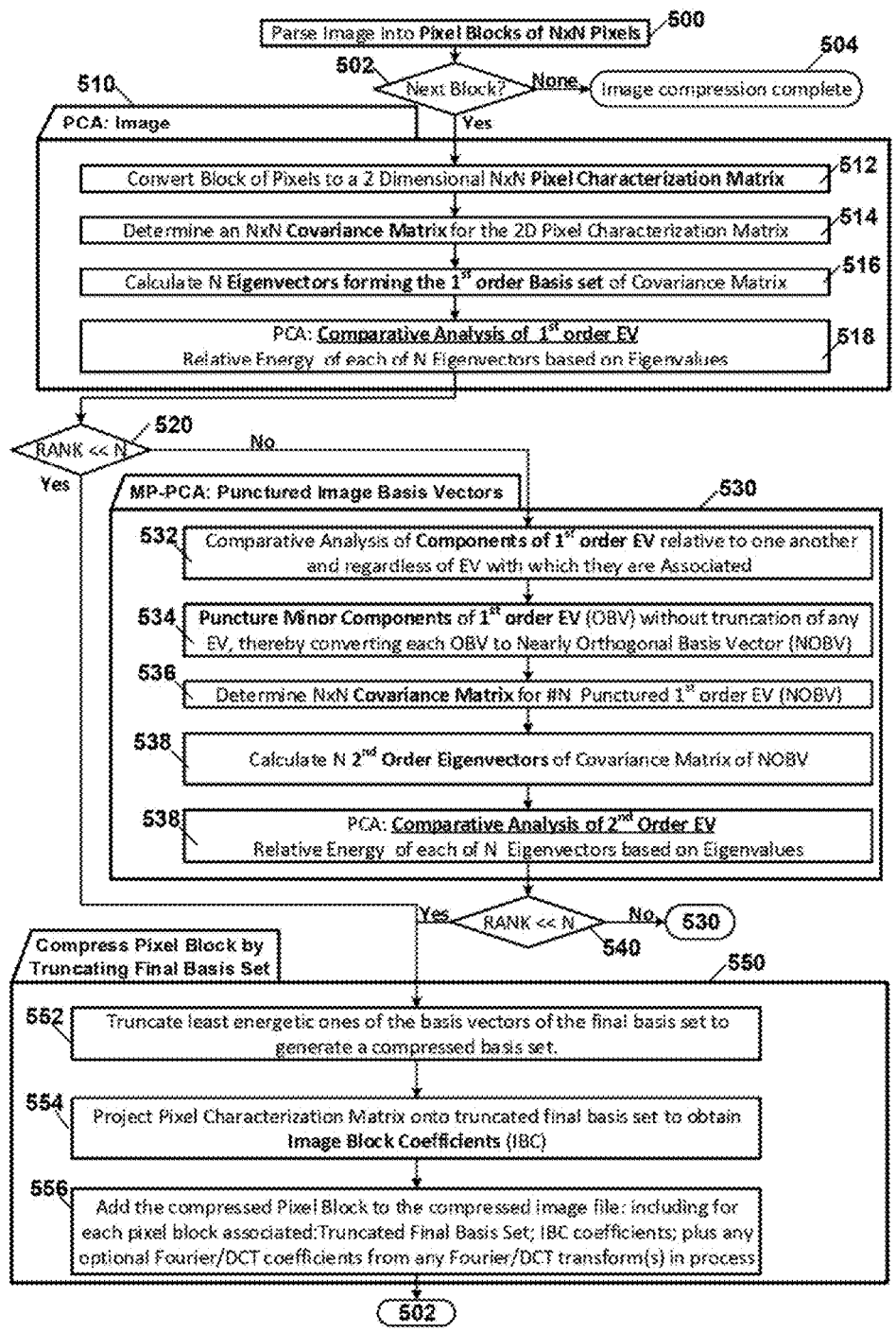
FIG. 5    Method for Increasing Fidelity of PCA Image Compression

COMPRESSION USING AN ITERATIVE DATA DERIVED BASIS SET

CROSS REFERENCE TO RELATED APPLICATION

This application claims the benefit of prior filed Provisional Application No. 62/046,704 filed on Sep. 5, 2014 entitled "Nearly Orthogonal and Condensed (NOC) Bases for Processing Array of Numerical Data" which is incorporated herein by reference in its entirety as if fully set forth herein.

BACKGROUND OF THE INVENTION

1. Field of Invention

The field of the present invention relates in general to image processing including image compression.

2. Description of the Related Art

Images whether obtained for civilian, medical, astronomical or military purposes comprise a grid of millions of pixels of data as to the properties of the relevant portion of the electromagnetic spectrum in which the image was obtained. Typically those properties are expressed in terms of colors in the visible spectrum. A cell phone camera is capable of 8 megapixel image capture resolution corresponding to a 3264×2448 sensor grid. A pixel is the smallest observable component of the two dimensional image plane of a digital image. Each pixel in turn may require as many as 24 bits of data to quantify the 16,777,216 possible colors of a single pixel. So the raw image captured by a cell phone may require 194,899,968 million bits of data. The shear size of the raw image presents problems for storage of the image on the cell phone or for transport of the image over the Internet. Similar considerations apply for medical and military imaging which are far larger in size.

Each raw image is compressed to reduce the storage requirements and reduce the latency associated with transport of an image. In a cell phone the compression takes place right on the phone. Image compression may be lossless or lossy, with the latter associated with far greater compression ratios.

Lossless image compression techniques like Run Length Encoding (RLE), Lempel-Ziv-Welch (LZW) and Huffman encoding, rasterize an image and categorize any redundancy in the sequence of successive colors of groups of pixels throughout the image to re-express the image in terms of symbols which represent each redundant group more compactly and which themselves are defined in an image specific lookup table or dictionary. The compressed image comprises the sequence of symbols and the associated dictionary. An image compressed using these 'entropy' encoding techniques exhibits no loss of information when decompressed and compared to the original raw image. One or more of these lossless techniques underpin both the popular "*.gif" and "*.png" image file formats.

Lossy image compression in general takes a far more aggressive approach to image characterization and associated compression, at a price of a loss of information with respect to the original raw image. Techniques for lossy image compression range from the simple to the complex. One example of a simple but lossy method of compression is the degradation in the color pallet of the image from 24 bit color per pixel to a single bit corresponding to a pixel color of black or white. The popular ".jpeg" image file format uses a Fourier transform and specifically the discrete cosine transform (DCT) to re-express rasterized blocks of the image in terms of the coefficients of a harmonic series with the highest frequency components of each block omitted from the compressed file. Another technique for lossy image file compression known as Principal Component Analysis (PCA) determines for each block of pixels within the image the principal component vectors, a.k.a. eigenvectors. Compression is achieved by discarding all except the most significant eigenvectors and using those principal eigenvectors to express the compressed image.

An image subject to lossy compression will have discernable differences from the original raw image. These differences increase in proportion to the compression ratio, expressed as a quotient of the raw image file size divided by the compressed image file size.

What is needed are improvements in image compression that allow increased compression ratios and resulting smaller compressed file sizes coupled with improved fidelity to the original raw image.

SUMMARY OF THE INVENTION

The present invention provides a method and apparatus for image compression. In an embodiment of the invention, the apparatus for compressing an image includes: a principal component analyzer, a puncture, a truncator, and a projector. The principal component analyzer iteratively performs a Principal Component Analysis (PCA) on a selected portion of the image, wherein each resulting orthogonal basis set has "N" basis vectors. The puncturer punctures selected dimensional components of the orthogonal basis set resulting from each PCA of the selected portion of the image, without removing any of the associated "N" basis vectors thereof. The truncator removes selected basis vectors of a final one of the resulting orthogonal basis sets of the principal component analyzer, thereby forming a truncated basis set for compression of the selected portion of the image. The projector projects the image onto the truncated basis set thereby obtaining coefficients of the selected portion of the image, relative to the truncated basis set.

The invention may be implemented in hardware, firmware or software.

Associated methods and computer readable media containing program instructions are also claimed.

BRIEF DESCRIPTION OF THE DRAWINGS

These and other features and advantages of the present invention will become more apparent to those skilled in the art from the following detailed description in conjunction with the appended drawings in which:

FIG. 5 is a process flow diagram of processes associated with the MP-PCA image compression in accordance with an embodiment of the invention.

DETAILED DESCRIPTION OF TH EMBODIMENTS

The present invention provides a method and apparatus for a extreme compression of an image up to two orders of magnitude greater than existing methods with substantial fidelity to the original raw image.

Figure 1:
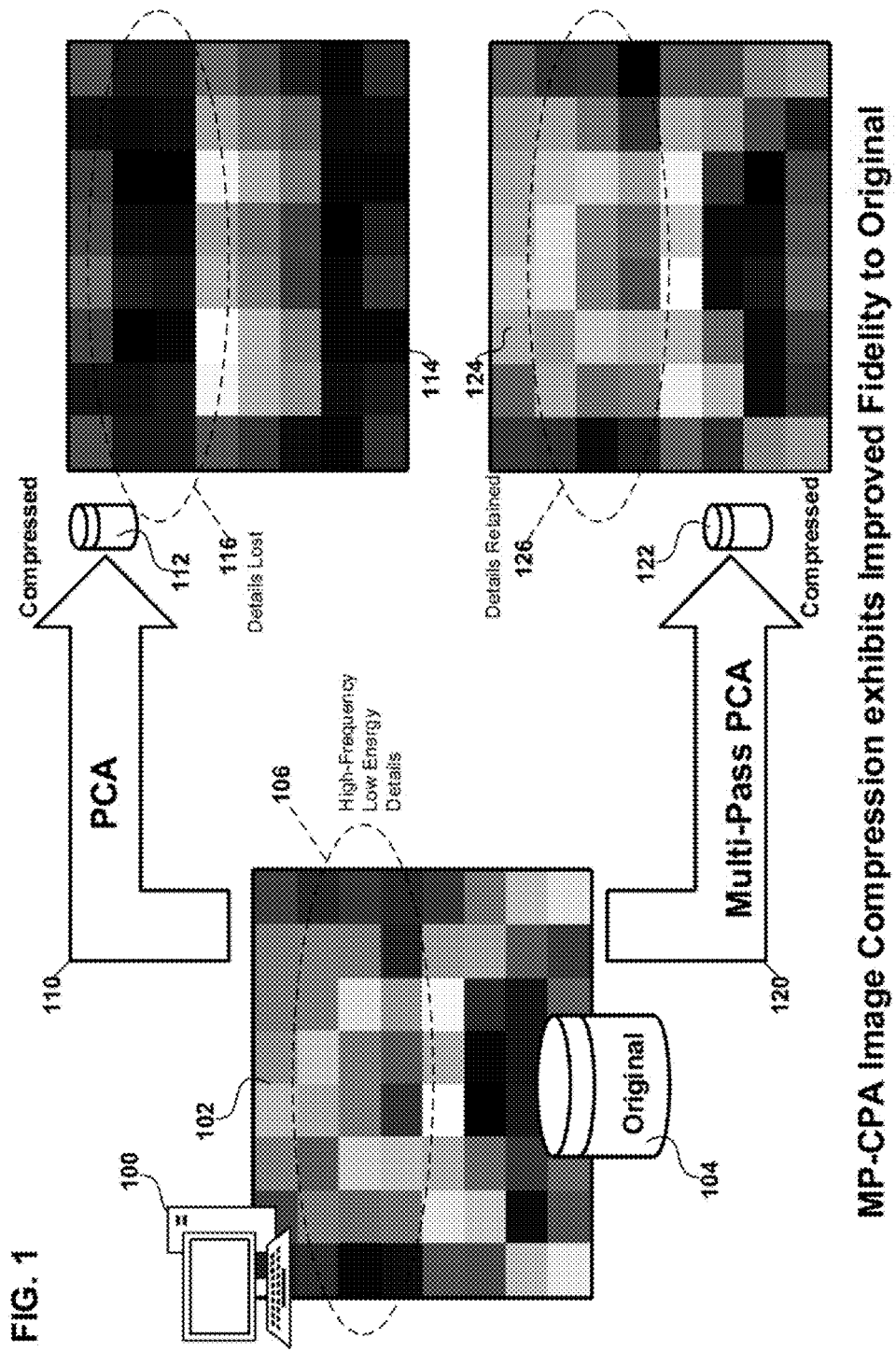
FIG. 1 shows a single raw original image and two compressed images derived therefrom via a Prior Art Principal Component Analysis (PCA) and a multi-pass (MP) PCA compression in accordance with an embodiment of the invention.

FIG. 1 shows a single raw original image 102 and two compressed images 114, 124 derived therefrom by processing on a computer 100. The raw image 102 is shown as an 8×8 pixel grid with each pixel having one of 255 greyscale values, and with the entire raw image having storage size requirements 104. The compressed image 114 is obtained using prior art PCA 110 to reduce the storage requirements 112 of the image. The prior art PCA compression is lossy with the most noticeable loss of information evident in region 116 of the compressed image which has lost the high frequency low energy details 106 which characterized the original raw image from which it was derived.

The compressed image 124 is obtained using a multi-pass PCA 120 in accordance with an embodiment of the current invention. This multi-pass PCA results in a significant improvement in fidelity to the original image at the same compression ratio, and same storage requirements 122 as the image compressed using prior art techniques. The multi-pass PCA compression of the current invention is lossy but with far greater retention, most noticeable in region 126 thereof, of the high frequency low energy details 106 which characterize the original raw image from which it was derived.

Figure 2:
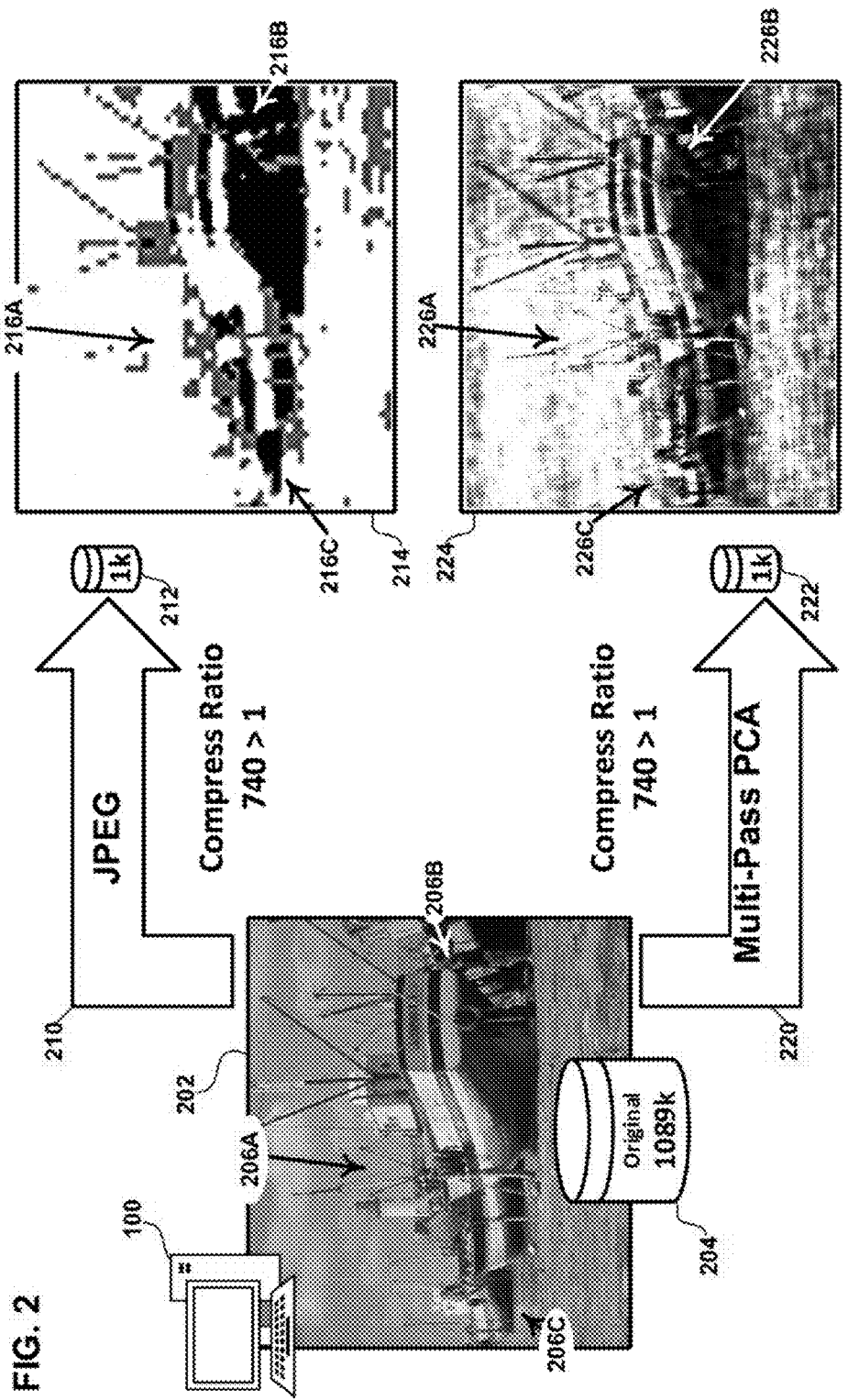
FIG. 2 shows a single raw original image in comparison to two compressed images derived therefrom via Prior Art JPEG compression and multi-pass PCA compression respectively.

FIG. 2 shows a single raw original image 202 in comparison to two compressed images 214, 224 derived therefrom via Prior Art JPEG compression 210 and multi-pass (MP) PCA compression 220 respectively. The two compressed images 214, 224 are derived from the raw image 202 by processing on a computer 100. The raw image 202 is shown as a 387×352 pixel grid with each pixel having one of 255 greyscale values, and with the entire raw image having storage size requirements 204 of 1089 k bits.

Compressed image 214 is obtained using prior art JPEG compression 210 has a storage requirement 212 of 1.4 k bits. The overall compression ratio is 740-to-1. The prior art JPEG compression is lossy with the loss of information evident across the entire compressed image including regions 216A-C. In region 216A of the JPEG compressed image, the mast and guide wires which are shown in region 206A of the original raw image are no longer visible. In region 216B of the JPEG compressed image, the man standing and the tire hanging off the back of the dry docked boat which are shown in region 206B of the original raw image are no longer visible. In region 216C of the JPEG compressed image, the third dry docked boat which is shown in region 206C of the original raw image is no longer visible.

Compressed image 224 is obtained using the multi-pass PCA 220 of an embodiment of the current invention. This multi-pass (MP) PCA results in a significant improvement in fidelity to the original image at the same compression ratio, and same storage requirements 122 as the image compressed using prior art techniques, e.g. JPEG. The multi-pass PCA compression of the current invention is lossy but with far greater information retention, most noticeable in region 226A-C of the compressed image. In region 226A of the MP-PCA compressed image, the mast and guide wires which are shown in region 206A of the original raw image are visible. In region 226B of the MP-PCA compressed image, the man standing and the tire hanging off the back of the dry docked boat which are shown in region 206B of the original raw image are also visible. In region 216C of the MP-PCA compressed image, the third dry docked boat which is shown in region 206C of the original raw image is also visible.

Figure 3:
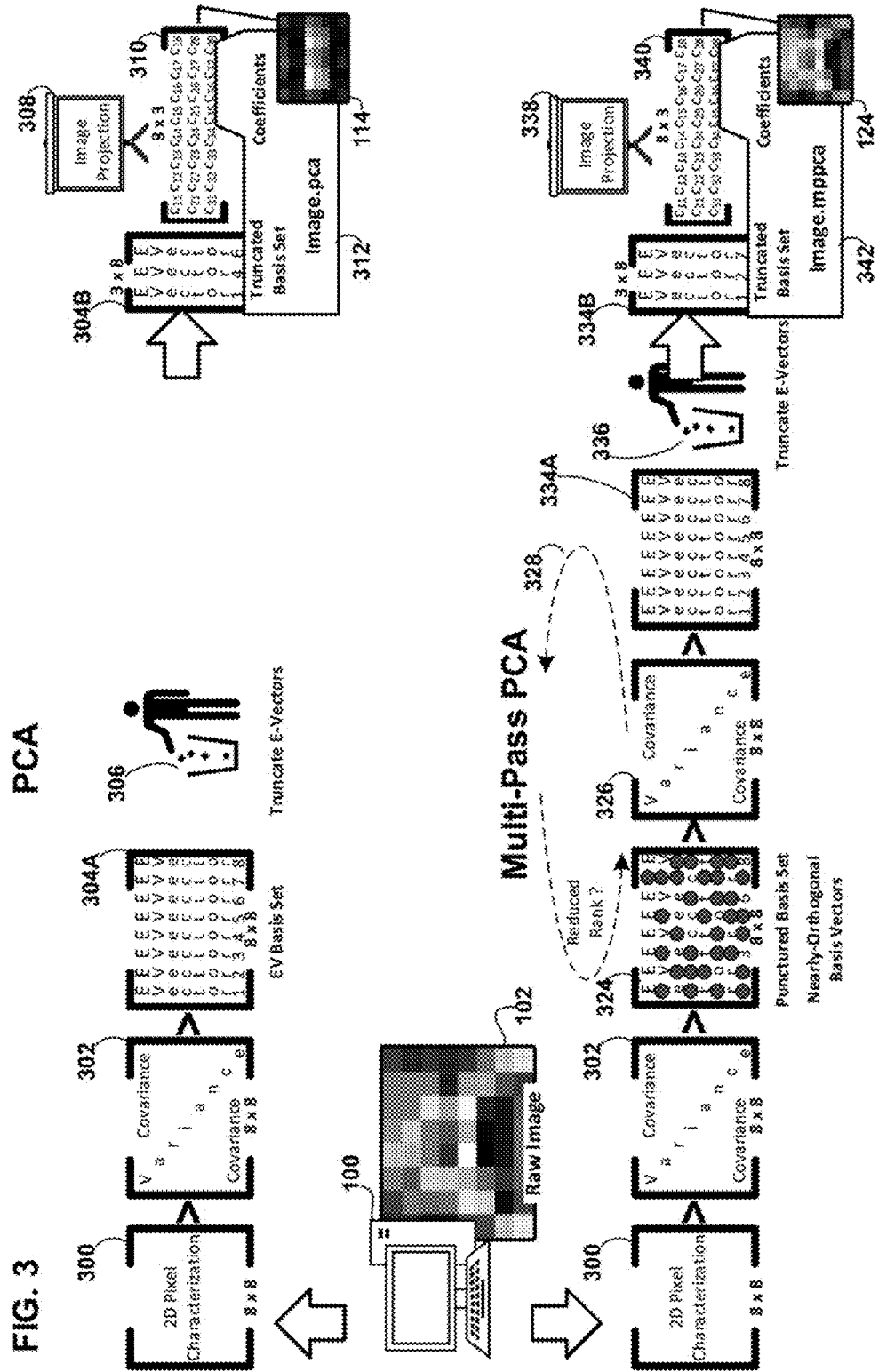
FIG. 3 is a view of the progression of data structures associated with the image compressions shown in FIG. 1.

FIG. 3 is a view of the progression of data structures associated with the Prior Art PCA compression and the Multi-Pass PCA (MP-PCA) of the current invention as shown in FIG. 1. The progression of data structures associated with Prior Art PCA compression are shown across the top of FIG. 3 in structures 300-310. The progression of data structures associated with MP-PCA compression in accordance with an embodiment of the invention are shown across the bottom of FIG. 3 in structures 300-340.

PCA, as shown in the progression of data structures along the top of FIG. 3, is initiated by partitioning of the raw image into square blocks of pixels. Each block identified as a 2D pixel characterization matrix 300. By way of example, an eight bit greyscale image might be partitioned into 8×8 pixel blocks encompassing 64 pixels. Each pixel would have a positive integer value ranging between 0 black and 255 white in magnitude depending on the color of the associated pixel.

Next a covariance matrix 302 is determined for the pixel characterization matrix. The covariance matrix is determined based on the characterization of the columns of the pixel characterization matrix as variables and the rows as samples or vice versa. The covariance matrix quantifies the linear relationship between all possible pairs of columns with respect to one another. The covariance matrix has the same dimensions as the pixel characterization matrix. Each row of the covariance matrix has coefficients which quantify the covarlance between one fixed column of pixels with respect to each remaining column of pixels in order. The diagonal elements of the covariance matrix are the variances of each column of pixels with respect to itself. The off diagonal covariance coefficients above and below the diagonal are identical to one another, since the covariance of one column with respect to another is identical in sign and magnitude to the covariance of the other column with respect to the one column. Equation 1 expresses the value of each component $V_{ij}$ of the covariance matrix of the pixel characterization matrix, in terms of the deviation of the corresponding columns of the pixel characterization matrix as follows:

$$V_{ij} = \sum_{r=1}^{N} \frac{(Ci_r - \overline{Ci})(Cj_r - \overline{Cj})}{N} = \sum \frac{c_i c_j}{N} \quad \text{Equation 1}$$

where:

N is the number of columns in the 2D pixel characterization matrix;

$\overline{C_i}$ is the mean of the pixel values in the $i^{th}$ column of pixels;

$\overline{C_j}$ is the mean of the pixel values in the $j^{th}$ column of pixels;

$Ci_r$ is the value of the pixel in the $r^{th}$ row of the $i^{th}$ column of pixels;

$Cj_r$ is the value of the $r^{th}$ row of the $j^{th}$ column of pixels;

$c_i$ is the deviation in the $i^{th}$ column of pixels; and $c_j$ is the deviation in the $j^{th}$ column of pixels.

For an 8×8 block of pixels there are 8 columns of pixels, so the components of the resultant 8×8 covariance matrix reflect all 64 possible combinations of column deviations as shown in the following Equation 2:

$$V = \begin{bmatrix} \sum c_1^2/N & \sum c_1 c_2/N & \cdots & \sum c_1 c_8/N \\ \sum c_2 c_1/N & \sum c_2^2/N & \cdots & \sum c_2 c_8/N \\ \cdots & \cdots & \cdots & \cdots \\ \sum c_8 c_1/N & \sum c_8 c_2/N & \cdots & \sum c_8^2/N \end{bmatrix} \quad \text{Equation 2}$$

Next the Eigenvectors 304A which characterize the directions or domains and sub-domains of the covariance matrix 302 are determined. These eigenvectors form the complete basis set for the covariance matrix. The eigenvectors are determined by: a) finding the polynomial or characteristic equation or polynomial for the covariance matrix; b) factoring the characteristic equation to determine the values a.k.a. eigenvalues, e.g. $\lambda_1, \lambda_2, \lambda_3, \lambda_4, \lambda_5, \lambda_6, \lambda_7, \lambda_8$ in the case of an 8×8 covariance matrix for which the characteristic equation equals zero; and c) determining for each eigenvalue $\lambda_i$ the associated eigenvector $V_i$ as shown in Equation 5.

The characteristic equation of the covariance matrix is defined in the following Equation 3 as the determinant of the matrix formed by subtracting from the covriance matrix the identity matrix with the diagonal elements scaled by A.

$$\text{Characteristic Equation} = |A - \lambda I| \quad \text{Equation 3}$$

where:
A is the covariance matrix;
$\lambda$ is a scalar; and
I is the identity matrix.

The Eigenvector associated with each eigenvalue of the characteristic equation of the covariance matrix are found by finding the null space of A−AI for each eigenvalue as defined in the following Equation 4.

$$(A - \lambda_i I)\overline{V_1} = 0 \text{ is} \quad \text{Equation 4}$$

where:
A is the covariance matrix;
$\lambda i$ is the $i^{th}$ eigenvalue;
I is an identity matrix;
$\overline{V_i}$ is the $i^{th}$ eigenvector; and
$\overline{0}$ is a zero vector.

If the Eigenvectors and Eigenvalues have been correctly determined they should satisfy the relationship shown in the following Equation 5.

$$A\overline{V_1} = \lambda_i \overline{V_1} \quad \text{Equation 5}$$

where:
A is the covariance matrix;
$\overline{V_i}$ is the $i^{th}$ eigenvector; and
$\lambda i$ is the $i^{th}$ eigenvalue.

Next the eigenvectors which form the basis set are truncated 306 to form a reduced basis set 304B for compressing the 2D pixel characterization matrix. Less energetic Eigenvectors associated with the highest frequency lowest energy information in the image, are deemed to be the least important sub-domains of the covariance matrix, and are removed, a.k.a. truncated, from the basis set. Next the 2D pixel characterization matrix 300 is projected 308 onto the reduced, a.k.a. truncated, basis set 304B to determine the associated coefficients 310. The PCA compressed image 114 is bundled into a file 312 including both the truncated basis set 304B and the coefficients 310 of the image block 300 projected thereon.

Multi-Pass (MP) PCA, as shown in the progression of data structures along the bottom of FIG. 3, is also initiated by partitioning of the raw image into square blocks of pixels. Each block identified as a 2D pixel characterization matrix 300.

Next the covariance matrix 302 is determined for the pixel characterization matrix as discussed above in connection with Prior Art PCA.

Next the $1^{st}$ order Eigenvectors which characterize the principal directions or domains and sub-domains of the covariance matrix 302 are determined. These eigenvectors which form the complete $1^{st}$ order basis set for the covariance matrix of the original image block, are not however subject to truncation as discussed above in connection with Prior Art PCA. Rather one or more components, a.k.a. coefficients, of one or more of the eigenvectors are punctured. Puncturing refers to the process of altering the direction of one or more eigenvectors by zeroing out one or more of the lowest energy coefficients, e.g. the lowest value coefficients thereof, without removing any one of the eigenvectors entirely. This has the effect of altering the orthogonality of the eigenvectors with respect to one another. The resultant punctured matrix 324 of eigenvectors is said to be a complete and nearly orthogonal basis set.

In an alternate embodiment of the invention puncturing is accomplished by performing a Fourier Transform, e.g. a discrete cosine transform (DCT) on each eigenvector and then puncturing, i.e. zeroing out one or more of the highest frequency, smallest variability, lowest energy coefficients in the direction of the eigenvectors of the series without removing any DCT series entirely. The mean direction of each eigenvector is given by the lowest frequency components of the Fourier transformation vectors which are retained.

In still another embodiment of the invention puncturing is accomplished by performing a two dimensional Fourier Transform on the eigenvector and then puncturing, i.e. zeroing out one or more of the highest frequency, smallest variability, lowest energy coefficients in the direction of the eigenvectors of the series without removing any DCT series entirely. The mean direction of each eigenvector is given by the lowest frequency components of the two dimensional Fourier transformation vectors which are retained.

In an alternate embodiment of the invention puncturing is accomplished by performing a Fourier Transform, e.g. a discrete cosine transform (DCT) on each eigenvector and quantizing the phase component of each coefficient in the series and then puncturing, i.e. zeroing out one or more of the highest frequency lowest energy coefficients of the series without removing any DCT series entirely. Phase quantization may be accomplished by limiting phase values to a limited number of associated angles e.g. 0, 90, 180, or 270 degrees.

Next the covariance matrix 326 is determined for the punctured basis set 324.

Next the Eigenvectors which characterize the principal directions or domains and sub-domains of the covariance matrix 326 are determined. These eigenvectors 334A form the complete $2^{nd}$ order/subsequent basis set for the covariance matrix 326 of the punctured basis set.

Next the eigenvectors 334A which form the $2^{nd}$ order basis set are truncated 336 to form a reduced basis set 334B for compressing the 2D pixel characterization matrix. Less energetic Eigenvectors associated with the highest frequency lowest energy information in the eivenvector basis of the covariance matrix of the image, are removed, a.k.a. truncated, from the basis set. Truncation of the orthogonal basis derived from the non-orthogonal punctured basis set does not remove features of the associated portion of the image, rather it projects them into a different basis set.

Determining what eigenvectors to truncate is based on the rank of the basis set. A basis set in which none of the eigenvalues is at or near zero, is said to exhibit "full" rank and as such not amenable to truncation. Conversely a basis set which is rank "deficient" can be subject to truncation of those eigenvectors whose corresponding eigenvalues are at or near to zero. How close an eigenvalue needs to be to zero in order to lower the rank of the basis set, may vary depending on overhead and latency requirements associated with the compression. In an embodiment of the invention the eigenvalues of a basis set which are close to zero, in terms of some established threshold value, will be zeroed out, and their corresponding eigenvectors will be subject to truncation. In another embodiment of the invention a basis set with a high rank, will be subject to one or more rounds of puncturing until one of more of the eigenvectors can be truncated based on eigenvalues at or near zero in value. In another embodiment of the invention, the threshold for determining how close to zero an eigenvalue needs to be in order to be subject to truncation, may be varied to reduce overhead or latency associated with the compression process.

By using PCA on the bases of the covariance matrix the dimensionality of each eigen-basis information is reduced without the removal of eigen features. Essentially Eigenvector data are projected to lower dimensional bases using PCA representation of the basis which removes dimensionality in the basis set, while maintaining information representation; thus even small energy components are represented by the large components within their Eigen-Vectors in the lower dimensional representation of the entire data set.

Next the 2D pixel characterization matrix 300 is projected 338 onto the reduced, a.k.a. truncated, basis set 334B to determine the associated image/pixel block coefficients 340. The MP-PCA compressed image 124 is bundled into a file 342 including both the truncated $2^{nd}$ order basis set 334B and the coefficients 340 of the image/pixel block 300 projected thereon.

In an alternate embodiment of the invention, there may be more than one round of puncturing. In other words, the rank of the $2^{nd}$ order basis set 334A may be evaluated and further rounds 328 of puncturing and redetermination of the resultant basis set may be initiated depending of the rank of the matrix as determined by the associated eigenvalues. A $2^{nd}$ order matrix with a full rank, may be subject to further puncturing and basis set determinations until the rank is reduced to a level where truncation will provide adequate compression without loss of feature information represented in the original image.

In still another embodiment of the invention, the puncturing of the $1^{st}$ order basis set may be conditioned on a determination 328 of the rank of the $1^{st}$ order basis set. If the rank is significantly less than the # or rows in the matrix then puncturing may not be necessary to adequately characterize the original image, and the block is compressed using only the truncated $1^{st}$ order basis set. Alternately, if the $1^{st}$ order matrix has a full rank, then puncturing will be necessary in order to reduce the size of the basis set.

Figure 4A:
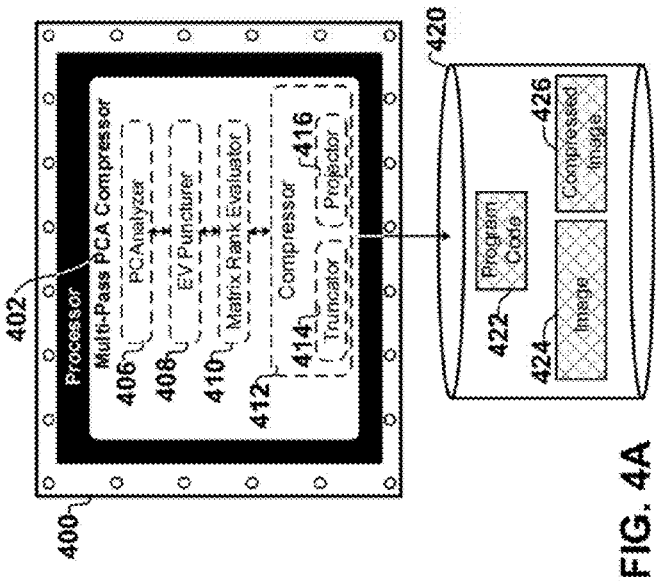
FIGS. 4A-C are hardware block diagrams of a processor, a computer, and a cell phone respectively for compression of an image in accordance with an embodiment of the invention.
Figure 4B:
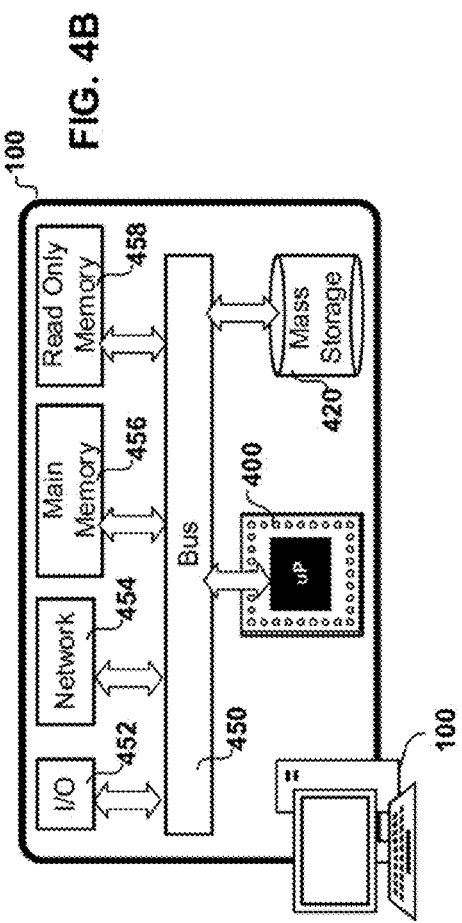
Figure 4C:
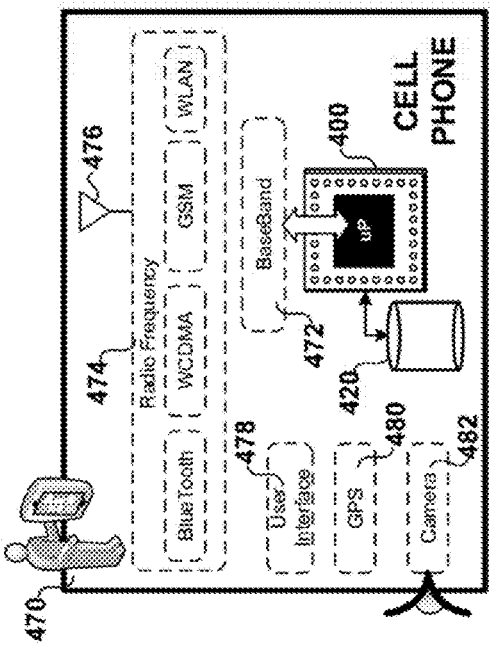

FIGS. 4A-C are hardware block diagrams of a processor, a computer, and a cell phone respectively for compression of an image in accordance with an embodiment of the invention.

FIG. 4A shows a processor 400 and storage 420 configured to execute program code 422 associated with the multi-pass (MP) PCA module 402 on one or more host devices. The MP-PCA module includes: a Principal Component Analyzer 406, an Eigenvector puncturer; a matrix rank-evaluator 410; and a compressor 412. The compressor includes a truncator 414 and a projector 416. In addition to program code 422, the storage includes raw images 424 and compressed images 426.

In operation the principal component analyzer 406 is configured to iteratively perform a Principal Component Analysis (PCA) on a selected portion of the image, wherein each resulting orthogonal basis set has "N" basis vectors. The eigenvector puncturer, a.k.a. basis set puncturer or puncturer, is configured to puncture selected dimensional components of the orthogonal basis set resulting from each PCA of the selected portion of the image, without removing any of the associated "N" basis vectors thereof. The compressor's truncator 414 is configured to remove selected basis vectors of a final one of the resulting orthogonal basis sets of the principal component analyzer, thereby forming a truncated basis set for compression of the selected portion of the image. The compressor's projector is configured to project the image onto the truncated basis set thereby obtaining coefficients of the selected portion of the image, relative to the truncated basis set. The matrix rank evaluator 410 is configured to evaluate the rank of each orthogonal basis set. The rank may then be used to determine the amount of truncation of the basis set. The rank in an alternate embodiment of the invention may be used to determine whether to puncture the initial basis set or whether to simply truncate the initial $1^{st}$ order basis set. The rank in still another embodiment of the invention may be used to determine whether additional rounds of puncturing and bases set determination are required for maximal compression of each image block.

FIG. 4B shows a computer configured as a host device. The server 752 includes the processor 400 and storage 420; a bus 450, a input/output (I/O) module 452 for interfacing with a user, a network module 454 for coupling to a network, a main memory 456 for storing and executing program code and data, and a read only memory 458 for storing boot up program code. The processor in addition to supporting the computer functionality also executes the program code 422 which provides MP-PCA compression functionality as discussed in connection with FIG. 4A.

FIG. 4C shows a cell/smart phone configured as a host device. The cell phone 102 includes the processor 400 and storage 420; a base band stage 872, a radio frequency (RF) stage 474 and an antenna 476. The processor in addition to supporting the cell phone functionality also executes the program code which provides the MP-PCA compression functionality as discussed above in FIG. 4A. The cell phone RF stage supports traditional cellular communication standards such as: global system for mobile (GSM) and wide code division multiple access (w-CDMA), and also one or more IEEE 802.11 wireless local area network (WLAN) protocols. Blue Tooth is typically also supported. The cell phone also includes a global positioning system (GPS) module 480, a display or other user interface 478, and a camera 482 from which the raw image(s) 424, subject to MP-PCA compression may be obtained.

FIG. 5 is a process flow diagram of processes associated with MP-PCA image compression in accordance with an embodiment of the invention. Processing begins in step 500 with the partitioning of the image into pixel blocks of N×N pixels. Next in decision process 502 a determination is made as to whether there is another block to compress. If there is a remaining pixel block to compress, then control is passed the PCA block of processes 510 associated with obtaining the $1^{st}$ order basis set of the pixel/image block.

PCA pixel block processing begins with the conversion 512 of the block of pixels to a 2 dimensional N×N pixel characterization matrix. In the case of an 8 bit greyscale image each components/coefficient of the pixel characterization matrix range between 0 (black) and 255 (white) depending on the value of the associated pixel. Where the image is a 24 bit color image with 8 bits allocated to each of the primary colors, e.g. red, green, and blue there may be three pixel characterization matrices for each pixel block, to represent the mix of three primary colors represented by each pixel. Next control is passed to process 514 in which the N×N covariance matrix of the 2D pixel characterization matrix is determined, as discussed above in connection with FIG. 3, matrix 302. Then in process 516 the $1^{st}$ order basis set comprising N orthogonal Eigenvectors of the Covariance matrix is determined, as discussed above in FIG. 3, matrix 304A. Next in process 518 a comparative analysis of the $1^{st}$ order eigenvectors is performed to determine the relative energy of the N eigenvectors based on the N associated; eigenvalues thereof.

The next step in the processing of the $1^{st}$ order basis set, varies depending on the embodiment of the invention. In an embodiment of the invention control pass directly to the Multi-Pass (MP) PCA block of processes 530. In another embodiment of the invention MP PCA processing is conditioned on a determination in decision process 520 as to the rank of the $1^{st}$ order eigenvectors, a.k.a. Initial eigenvectors. If the rank is low indicating that only a fraction of the eigenvectors are required to adequately characterize the image block then control may be passed directly to the block of processes 550 associated with compressing the image. If the rank is not low, and if most of the eigenvectors of the $1^{st}$ order basis set appear necessary to adequately characterize the image then in this embodiment of the invention control is passed to the MP-PCA block of processes 530.

In process 532 a comparative analysis of the components of the $1^{st}$ order eigenvectors is implemented. Then in process 534 the minor components of one or more of the $1^{st}$ order eigenvectors is effected without truncation of any of the eigenvectors. This has the effect of de-orthogonalizing the eigenvectors which are now characterizable as nearly orthogonal basis vectors as discussed above in FIG. 3 in connection with the punctured basis set 324. The puncturing may in an embodiment of the invention be preceded by a Fourier or Discrete cosine Transform of each eigenvector followed by puncturing of the of selected low energy ones of the coefficients of each eigenvectors DCT representation, without removing any of the corresponding DCT series representation thereof entirely. Next in process 536 the N×N covariance matrix of the #N Punctured $1^{st}$ order, a.k.a. nearly orthogonal eigenvectors, is determined as discussed above in FIG. 3 reference 326. In process 538 the #N $2^{nd}$ order Eigenvectors of the Covariance Matrix of the nearly orthogonal basis vectors is determined as discussed above in connection with FIG. 3 reference 334A. Then in process 538 a comparative analysis of the $2^{nd}$ order eigenvectors is performed to determine the relative energy of the N eigenvectors based on the N associated eigenvalues thereof.

The next step in the processing of the $2^{nd}$ order basis set, varies depending on the embodiment of the invention. In an embodiment of the invention control passes directly to the block 550 of compression processes. In another embodiment of the invention further iterations of MP PCA processing are conditioned on a determination in decision process 540 as to the rank of the $2^{nd}$ order or subsequent eigenvectors. If the rank is low indicating that only a fraction of the eigenvectors are required to adequately characterize the image block then control may be passed directly to the block of processes 550 associated with compressing the image. If the rank is not low, and if most of the eigenvectors of the $2^{nd}$ order basis set appear necessary to adequately characterize the image then in this embodiment of the invention control is returned to the MP-PCA block of processes 530 for further puncturing and re-orthogonalizatlon of successive basis sets until the rank has decreased sufficiently to pass control to the block 550 of compression processes.

Next control is passed to the block of processes 550 associated with compressing the pixel block. In process 552 the final set of basis vectors is truncated thereby removing the least energetic ones of the basis vectors to generate a compressed/truncated basis set. In an embodiment of the invention the final basis set is composed of $2^{nd}$ order or succeeding eigenvectors output by the MP-PCA process block 530. In another embodiment of the invention in which decision process 520 results in the avoidance of MP-PCA for some of the pixel blocks of the image the final basis set is composed of the $1^{st}$ order eigenvectors output by the PCA block of processes 510. In any case control is then passed to process 554 in which the projection of the pixel characterization matrix onto the truncated final basis set is utilized to obtain the image block coefficients associated with the compressed image block. Next in process 556 the compressed Pixel Block is added to the compressed image file including associated: truncated final basis set; image block IBC coefficients; plus any optional Fourier/DCT coefficients from any Fourier/DCT transform(s) overlaid in the processing. Control then returns to decision process 502 for a determination as to whether all blocks of the image have been processed, in which case control is passed to process 504 in which the compressed image is saved in a file.

In alternate embodiments of the invention Fourier or DCT processing overlays may be added to puncturing process 534. In still other embodiments of the invention an overlay of Fourier or DCT processing may be utilized on the pixel characterization matrix 512 or on the $1^{st}$ order eigenvectors in process 516, without in either case departing from the scope of the claimed invention.

In alternate embodiments the rank determination in either of the optional decision processes 520 and 530 may be carried out by determining whether the eigenvalues have any significant separation in values any non-uniformity in their otherwise gradual decrease in importance. The rank will then be associated with the column/eigenvector at which the discontinuity is evident.

The components and processes disclosed herein may be implemented a software, hardware, firmware, or a combination thereof including program code software, a memory element for storing the program code software and a processor for executing the program code software, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for compressing an image; comprising:
a principal component analyzer configured to iteratively perform a Principal Component Analysis (PCA) on a selected portion of the image, wherein each resulting orthogonal basis set has "N" basis vectors;
a matrix rank evaluator to evaluate the rank of each orthogonal basis set;
the principal component analyzer further configured to iteratively perform the PCA based on the rank of an initial orthogonal basis set as evaluated by the matrix rank evaluator, whereby the initial orthogonal basis set exhibiting a low rank results in a negative determination with respect to the performance of a subsequent PCA and vice versa;
a puncturer configured to puncture selected dimensional components of the orthogonal basis set resulting from each PCA of the selected portion of the image, without removing any of the associated "N" basis vectors thereof;
a truncator configured to remove selected basis vectors of a final one of the resulting orthogonal basis sets of the principal component analyzer, thereby forming a truncated basis set for compression of the selected portion of the image;
a projector configured to project the image onto the truncated basis set thereby obtaining coefficients of the selected portion of the image, relative to the truncated basis set.

2. An apparatus for compressing an image; comprising:
a principal component analyzer configured to iteratively perform a Principal Component Analysis (PCA) on a selected portion of the image, wherein each resulting orthogonal basis set has "N" basis vectors;
a matrix rank evaluator to evaluate the rank of each orthogonal basis set;
the principal component analyzer further configured to conditionally iteratively perform the PCA based on the rank of each orthogonal basis set as evaluated by the matrix rank evaluator, whereby an orthogonal basis set exhibiting a low rank results in a negative determination with respect to the performance of another iteration and vice versa;
a puncturer configured to puncture selected dimensional components of the orthogonal basis set resulting from each PCA of the selected portion of the image, without removing any of the associated "N" basis vectors thereof;
a truncator configured to remove selected basis vectors of a final one of the resulting orthogonal basis sets of the principal component analyzer, thereby forming a truncated basis set for compression of the selected portion of the image;
a projector configured to project the image onto the truncated basis set thereby obtaining coefficients of the selected portion of the image, relative to the truncated basis set.

3. The apparatus for compressing an image of claim 2, further comprising:
the principal component analyzer further configured to conditionally iteratively perform the PCA based on the rank of each orthogonal basis set as evaluated by the matrix rank evaluator, wherein the rank of a basis set corresponds with a maximal number of linearly independent rows or columns of the basis set, and whereby an orthogonal basis set exhibiting a low rank results in a negative determination with respect to the performance of another iteration and vice versa.

4. An apparatus for compressing an image; comprising:
a principal component analyzer configured to iteratively perform a Principal Component Analysis (PCA) on a selected portion of the image, wherein each resulting orthogonal basis set has "N" basis vectors;
a puncturer configured to puncture selected dimensional components of the orthogonal basis set resulting from each PCA of the selected portion of the image, without removing any of the associated "N" basis vectors thereof; and the puncturer further configured to transform each of the "N" basis vectors in the prior orthogonal basis set into a corresponding Fourier series and to puncture higher frequency ones of the Fourier series coefficients associated with the "N" basis vectors
a truncator configured to remove selected basis vectors of a final one of the resulting orthogonal basis sets of the principal component analyzer, thereby forming a truncated basis set for compression of the selected portion of the image; and
a protector configured to project the image onto the truncated basis set thereby obtaining coefficients of the selected portion of the image, relative to the truncated basis set.

5. The apparatus for compressing an image of claim 4, further comprising:
the puncturer further configured to transform each of the "N" basis vectors in the prior orthogonal basis set into a corresponding Fourier series, to quantize a phase component of the coefficients of each of the "N" basis vector's associated Fourier series; and to puncture higher frequency ones of the Fourier series coefficients associated with the "N" basis vectors.

6. A method for compressing an image; comprising:
iteratively performing a Principal Component Analysis (PCA) on a selected portion of the image, wherein each resulting orthogonal basis set has "N" basis vectors; and with each iteration including:
puncturing of selected dimensional components of the orthogonal basis set resulting from each PCA of the selected portion of the image, without removing any of the associated "N" basis vectors thereof; and
wherein the iterative act further comprises:
performing an initial Principal Component Analysis (PCA) on the selected portion of the image, wherein the resulting "N" basis vectors form an initial orthogonal basis set;
puncturing selected dimensional components of the initial orthogonal basis set without removing any of the associated "N" basis vectors thereof; whereby the initial orthogonal basis set becomes a nearly orthogonal basis set;
performing a subsequent PCA on the nearly orthogonal basis set, thereby forming the final orthogonal basis set;
removing selected basis vectors of a final one of the resulting orthogonal basis sets of the iteration act; thereby forming a truncated basis set for compression of the selected portion of the image; and
projecting the image onto the truncated basis set thereby obtaining coefficients of the selected portion of the image, relative to the truncated basis set.

7. A method for compressing an image; comprising:
iteratively performing a Principal Component Analysis (PCA) on a selected portion of the image, wherein each resulting orthogonal basis set has "N" basis vectors; and with each iteration including:
puncturing of selected dimensional components of the orthogonal basis set resulting from each PCA of the selected portion of the image, without removing any of the associated "N" basis vectors thereof; and wherein the iterative act further comprises:
  conditionally iteratively performing the PCA based on a determination of a rank of an initial orthogonal basis set, whereby the initial orthogonal basis set exhibiting a low rank results in a negative determination with respect to the performance of the puncturing and subsequent PCA and vice versa;
  removing selected basis vectors of a final one of the resulting orthogonal basis sets of the iteration act; thereby forming a truncated basis set for compression of the selected portion of the image; and
  projecting the image onto the truncated basis set thereby obtaining coefficients of the selected portion of the image, relative to the truncated basis set.

8. A method for compressing an image; comprising:
iteratively performing a Principal Component Analysis (PCA) on a selected portion of the image, wherein each resulting orthogonal basis set has "N" basis vectors; and with each iteration including:
  puncturing of selected dimensional components of the orthogonal basis set resulting from each PCA of the selected portion of the image, without removing any of the associated "N" basis vectors thereof; and
wherein the iterative act further comprises:
  conditionally iteratively performing the PCA based on a determination of a rank of each orthogonal basis set, whereby an orthogonal basis set exhibiting a low rank results in a negative determination with respect to the performance of the puncturing and subsequent PCA and vice versa;
  removing selected basis vectors of a final one of the resulting orthogonal basis sets of the iteration act; thereby forming a truncated basis set for compression of the selected portion of the image; and
  projecting the image onto the truncated basis set thereby obtaining coefficients of the selected portion of the image, relative to the truncated basis set.

9. The method for compressing an image of claim 8, wherein the iterative act further comprises:
  conditionally iteratively performing the PCA based on a determination of a rank of each orthogonal basis set, wherein the rank of a basis set corresponds with a maximal number of linearly independent rows or columns of the basis set, and whereby an orthogonal basis set exhibiting a low rank results in a negative determination with respect to the performance of another iteration and vice versa.

10. A method for compressing an image; comprising:
iteratively performing a Principal Component Analysis (PCA) on a selected portion of the image, wherein each resulting orthogonal basis set has "N" basis vectors; and with each iteration including:
  puncturing of selected dimensional components of the orthogonal basis set resulting from each PCA of the selected portion of the image, without removing any of the associated "N" basis vectors thereof; and
wherein the iterative act further comprises:
  transforming each of the "N" basis vectors in the prior orthogonal basis set into a corresponding Fourier series; and
  puncturing higher frequency ones of the Fourier series coefficients associated with the "N" basis vectors;
  removing selected basis vectors of a final one of the resulting orthogonal basis sets of the iteration act; thereby forming a truncated basis set for compression of the selected portion of the image; and
  projecting the image onto the truncated basis set thereby obtaining coefficients of the selected portion of the image, relative to the truncated basis set.

11. The method for compressing an image of claim 10, wherein the iterative act further comprises:
  transforming each of the "N" basis vectors in the prior orthogonal basis set into a corresponding Fourier series;
  quantizing a phase component of the coefficients of each of the "N" basis vector's associated Fourier series; and
  puncturing higher frequency ones of the Fourier series coefficients associated with the "N" basis vectors.

12. A non-transient computer readable medium containing program instructions for causing a computer to perform the method of:
iteratively performing a Principal Component Analysis (PCA) on a selected portion of an image, wherein each resulting orthogonal basis set has "N" basis vectors; and with each iteration including:
  puncturing of selected dimensional components of the orthogonal basis set resulting from each PCA of the selected portion of the image, without removing any of the associated "N" basis vectors thereof; and
  conditionally iteratively performing the PCA based on a determination of a rank of an initial orthogonal basis set, whereby the initial orthogonal basis set exhibiting a low rank results in a negative determination with respect to the performance of the puncturing and subsequent PCA and vice versa;
removing selected basis vectors of a final one of the resulting orthogonal basis sets of the iteration act; thereby forming a truncated basis set for compression of the selected portion of the image; and
projecting the image onto the truncated basis set thereby obtaining coefficients of the selected portion of the image, relative to the truncated basis set.

13. A non-transient computer readable medium containing program instructions for causing a computer to perform the method of:
iteratively performing a Principal Component Analysis (PCA) on a selected portion of an image, wherein each resulting orthogonal basis set has "N" basis vectors; and with each iteration including:
  transforming each of the "N" basis vectors in the prior orthogonal basis set into a corresponding Fourier series; and
  puncturing of selected dimensional components of the orthogonal basis set resulting from each PCA of the selected portion of the image, without removing any of the associated "N" basis vectors thereof; including:
    puncturing higher frequency ones of the Fourier series coefficients associated with the "N" basis vectors;
removing selected basis vectors of a final one of the resulting orthogonal basis sets of the iteration act; thereby forming a truncated basis set for compression of the selected portion of the image; and
projecting the image onto the truncated basis set thereby obtaining coefficients of the selected portion of the image, relative to the truncated basis set.

* * * * *